United States Patent
Staszak et al.

(10) Patent No.: US 7,063,167 B1
(45) Date of Patent: Jun. 20, 2006

(54) SELF LEVELING TOWED IMPLEMENT

(75) Inventors: Albert W. Staszak, Woodridge, IL (US); Donald J. Sanderson, Puslinch (CA); Eugen J. Birkenbach, Kildeer, IL (US)

(73) Assignee: Case Corporation, Racine, WI (US)

( * ) Notice: Subject to any disclaimer, the term of this patent is extended or adjusted under 35 U.S.C. 154(b) by 1179 days.

(21) Appl. No.: 09/596,521

(22) Filed: Jun. 16, 2000

(51) Int. Cl.
*A01B 49/00* (2006.01)
*A01B 63/00* (2006.01)

(52) U.S. Cl. .................. 172/328; 172/4.5; 172/311; 172/322

(58) Field of Classification Search .............. 172/2, 172/4.5, 779, 310, 311, 322, 323, 324, 326, 172/327, 328, 605, 669, 677, 679, 680; 60/416, 60/469
See application file for complete search history.

(56) References Cited

U.S. PATENT DOCUMENTS

| | | | | |
|---|---|---|---|---|
| 3,762,480 A | | 10/1973 | Hofer | 172/4 |
| 3,870,107 A | * | 3/1975 | Orthman | 172/413 |
| 3,912,018 A | | 10/1975 | Brundage et al. | 172/328 |
| 3,970,327 A | * | 7/1976 | Dezelan | 280/683 |
| 4,193,458 A | | 3/1980 | Meinert et al. | 172/328 |
| 4,379,491 A | * | 4/1983 | Riewerts et al. | 172/328 |
| 4,606,413 A | | 8/1986 | Hake | 172/328 |
| 4,648,466 A | * | 3/1987 | Baker et al. | 60/416 |
| 4,712,622 A | * | 12/1987 | Birkenbach et al. | 172/328 |
| 4,809,786 A | | 3/1989 | Hoehn et al. | 172/316 |
| 5,152,347 A | | 10/1992 | Miller | 172/7 |
| 5,348,101 A | | 9/1994 | Fox et al. | 172/2 |
| 5,562,165 A | * | 10/1996 | Janelle et al. | 172/4 |
| 6,035,943 A | * | 3/2000 | Gerein et al. | 172/328 |
| 6,125,775 A | * | 10/2000 | Gust | 172/328 |

* cited by examiner

*Primary Examiner*—Robert E. Pezzuto
*Assistant Examiner*—Nathan Mammen

(57) ABSTRACT

An implement has a tongue used to tow the implement that can be raised or lowered with respect to the rest of the implement. The tongue is raised or lowered by a hydraulic cylinder. The raising and lowering ports of the cylinder are connected to two hydraulic accumulators to permit the tongue to flex up or down while the implement is towed through the field. These accumulators are disconnected from the cylinder when the wings of the implement are lifted and the implement is towed over the road to prevent the implement from oscillating backwards and forward about an axis defined by its wheels.

17 Claims, 6 Drawing Sheets

SELF LEVELING TOWED IMPLEMENT

FIELD OF THE INVENTION

The invention relates generally to towed agricultural implements. More particularly it relates to implements having an adjustable tongue.

BACKGROUND OF THE INVENTION

Many agricultural implements are designed to be towed behind a towing vehicle such as a tractor. A major problem in designing these implements is in providing them with sufficient flexibility to accurately follow the contours of the ground in the agricultural fields in which they are used. It is essential that many ground engaging implements such as harrows, rakes, seeders, planters, and chemical applicators, follow the ground contours accurately. All of these implements are designed to engage and process the soil at quite specific depths on the order of a few inches. The ability to properly engage the contours of the ground becomes more difficult as the lateral dimensions of the implements increase. A partial solution is provided by dividing the implement up into a plurality of sections, each of which being hinged to the adjacent section to permit an implement to "bend" in the middle. Actually, the implements do not bend per se, but the laterally disposed sections pivot with respect to each other about their hinges to approximate the contours of the ground.

While dividing an implement up into laterally hinged sections solves the contour-following problem in a side-to-side direction, it does not solve the problem in a fore-and-aft direction. Implements are often provided with two or more ranks of ground working tools spaced fore-and-aft from the front of the implement to the rear of the implement. As the tractor goes over a hill, it can depress the tongue of the implement. This will cause the front rank of tools to dig into the ground more deeply than the rear rank of tools. If the implement's tongue itself is tilted too high or too low, it can cause the front or rear rank of tools to dig too deeply into the soil even when the tractor and implement are traveling over smooth and level ground. To reduce this inability to follow the contours of the ground in the fore-and-aft direction, implements may be provided with an adjustable linkage that permits the tongue to be raised or lowered with respect to the implement, thus permitting the front and rear ranks of tools to be adjusted to engage the ground equally. A coil spring can be provided in this adjustment linkage to permit a degree of up-and-down flexure of the tongue to permit the implement to better follow the ground when passing over the top of a hill.

One problem with this spring loaded tongue adjustment system, however, is particularly troublesome with larger implements having longer laterally extending wings when traveling over the road. To travel over the road, the implement's wheels are typically extended downward until all the ground working tools are raised above ground level and the implement is resting on its wheels. In addition, the wings of the implement must be folded up in the air above the main frame of the implement to permit the implement to fit in a single highway lane width. When the wings are lifted, they significantly raise the center of mass of the implement above the implement wheels. The larger the wings extend from side-to-side when lowered, the higher they extend up in the air when raised and the higher the center of mass is disposed above the ground. For implements supported on wheels extending from all four corners of the vehicle this high center of mass does not pose a significant problem. For implements supported on two or more wheels spaced laterally along a single side-to-side line, however, this arrangement is unstable and permits fore-and-aft oscillation of the wings as the spring loaded tongue flexes up and down.

What is needed, therefore is a method and apparatus for permitting the tongue to move up and down during field working, and reducing this up and down motion when the implement is folded up and raised on its wheels for towing on a road. It is an object of this invention to provide such a method and apparatus.

SUMMARY OF THE INVENTION

In accordance with the first embodiment of the invention, a system for leveling an implement having a tongue engageable to a towing vehicle for towing the implement is provided including a hydraulic cylinder having a first hydraulic fluid port disposed to move the cylinder when filled with fluid in a first direction wherein the cylinder is mechanically culpable to the tongue to raise and lower the tongue with respect to the implement when the cylinder is actuated, a first gas-filled hydraulic accumulator fluidly coupled to the first hydraulic fluid port on the cylinder, a first on/off valve coupled between the first accumulator and the first hydraulic fluid port on the cylinder to connect and disconnect the first accumulator from fluid communication with the cylinder, and a first directional control valve to selectively connect the first hydraulic both to a source of hydraulic fluid under pressure to fill the cylinder with hydraulic fluid and to a hydraulic tank to drain the cylinder of hydraulic fluid. The system may include an operator-actuable switch for actuating the first on/off valve. The system may include a first check valve disposed between the first hydraulic fluid port and the first directional control valve and disposed to limit the return of fluid from the first hydraulic fluid port to the first directional control valve. The cylinder may have a second hydraulic fluid port disposed to move the cylinder when filled with fluid in a second direction opposite the first direction and the system may include a second gas-filled hydraulic accumulator fluidly coupled to the second hydraulic fluid port on the cylinder, a second on/off valve coupled between the second accumulator and the second hydraulic fluid port on the cylinder to connect and disconnect the second accumulator from fluid communication with the cylinder, and a second directional control valve to selectively connect the second hydraulic port both to the source of hydraulic fluid under pressure to fill the cylinder with hydraulic fluid and to the hydraulic tank to drain the cylinder of hydraulic fluid. The first and second directional control valves may be coupled to drain fluid from the cylinder through the first hydraulic fluid port to the tank while simultaneously filling the cylinder with hydraulic fluid through the second hydraulic fluid port from the hydraulic supply. The operator-actuable switch may also actuate the second on/off valve. A second check valve may be disposed between the second hydraulic fluid port and the second directional control valve and be disposed to limit the return of fluid from the second hydraulic fluid port to the second directional control valve. The first and second check valves may be pilot operated, wherein a pilot line for each of the first and second check valves is cross-coupled to the other of the first and second check valves.

In accordance with the second embodiment of the invention, an agricultural implement is provided including an implement frame, a tongue pivotally coupled to the implement frame to be raised and lowered with respect to the frame and configured to be coupled to a towing vehicle to tow the implement, a hydraulic cylinder having a first hydraulic fluid port disposed to move the cylinder when filled with fluid in a first direction, wherein the cylinder is mechanically coupled to the tongue to raise and lower the tongue with respect to the implement frame when the cylinder is actuated, a first gas-filled hydraulic accumulator fluidly coupled to the first hydraulic fluid port on the cylinder, a first on/off valve coupled between the first accumulator and the first hydraulic fluid port on the cylinder to connect and disconnect the first accumulator from fluid communication with this cylinder, and a first directional control valve to selectively connect the first hydraulic port both to a source of hydraulic fluid under pressure to fill the cylinder with hydraulic fluid and to a hydraulic tank to drain the cylinder of hydraulic fluid. The implement may include an operator-actuable switch for actuating the first on/off valve. The implement may also include a first check valve disposed between the first hydraulic fluid port and the first directional control valve and disposed to limit the return of fluid from the first hydraulic fluid port to the first directional control valve. The cylinder may have a second hydraulic fluid port disposed to move the cylinder when filled with fluid in a second direction opposite the first direction. The implement may further include a second gas-filled hydraulic accumulator fluidly coupled to the second hydraulic fluid port on a cylinder, a second on/off valve coupled between the second accumulator and the second hydraulic fluid port on the cylinder to connect and disconnect the second accumulator from fluid communication with the cylinder, and a second directional control valve to selectively connect the second hydraulic port both to the source of hydraulic fluid under pressure to fill the cylinder with hydraulic fluid, and to the hydraulic tank to drain the cylinder of hydraulic fluid. The first and second directional control valves may be coupled to drain fluid from the cylinder through the first hydraulic fluid port to the tank while simultaneously filling the cylinder with hydraulic fluid through the second hydraulic fluid port from the hydraulic supply. The operator-actuable switch may also actuate the second on/off valve. The implement may further include a second check valve disposed between the second hydraulic fluid port and the second directional control valve and be disposed to limit the return of fluid from the second hydraulic fluid port to the second directional control valve. The first and second check valves may be pilot operated, and a pilot line for each of the first and second check valves may be cross-coupled to the other of the first and second check valves.

In accordance with a third embodiment of the invention, a method of reducing fore-and-aft oscillations in a towed implement, the towed implement having a tongue pivotally coupled to an implement frame, a hydraulic cylinder coupled between the tongue and the implement frame to raise and lower the tongue with respect to the frame thereby causing the implement frame to tilt forward and backward about at least two implement wheels coupled to and supporting the implement frame, at least one wing pivotally coupled to the implement frame and configured to be raised with respect to the implement frame to a position above the frame, and a gas-filled hydraulic accumulator fluidly coupled to the cylinder, where the method includes the steps of pivoting the wing upward with respect to the implement frame, and disengaging the accumulator from the cylinder. The step of pivoting the wing upward with respect to the implement frame may include the step of automatically engaging a position switch indicative of an upwardly pivoted wing position and the step of disengaging the accumulator from the cylinder may include the step of automatically responding to the position switch engagement. The position switch may be electrically coupled to an on/off valve disposed to engage and disengage the accumulator from the cylinder. The step of disengaging the accumulator from the cylinder may include the step of manually actuating a switch electrically coupled to an on/off valve disposed to engage and disengage the accumulator from the cylinder.

Other principal features and advantages of the invention will become apparent to those skilled in the art upon review of the following drawings, the detailed description and the appended claims.

Figure 1:
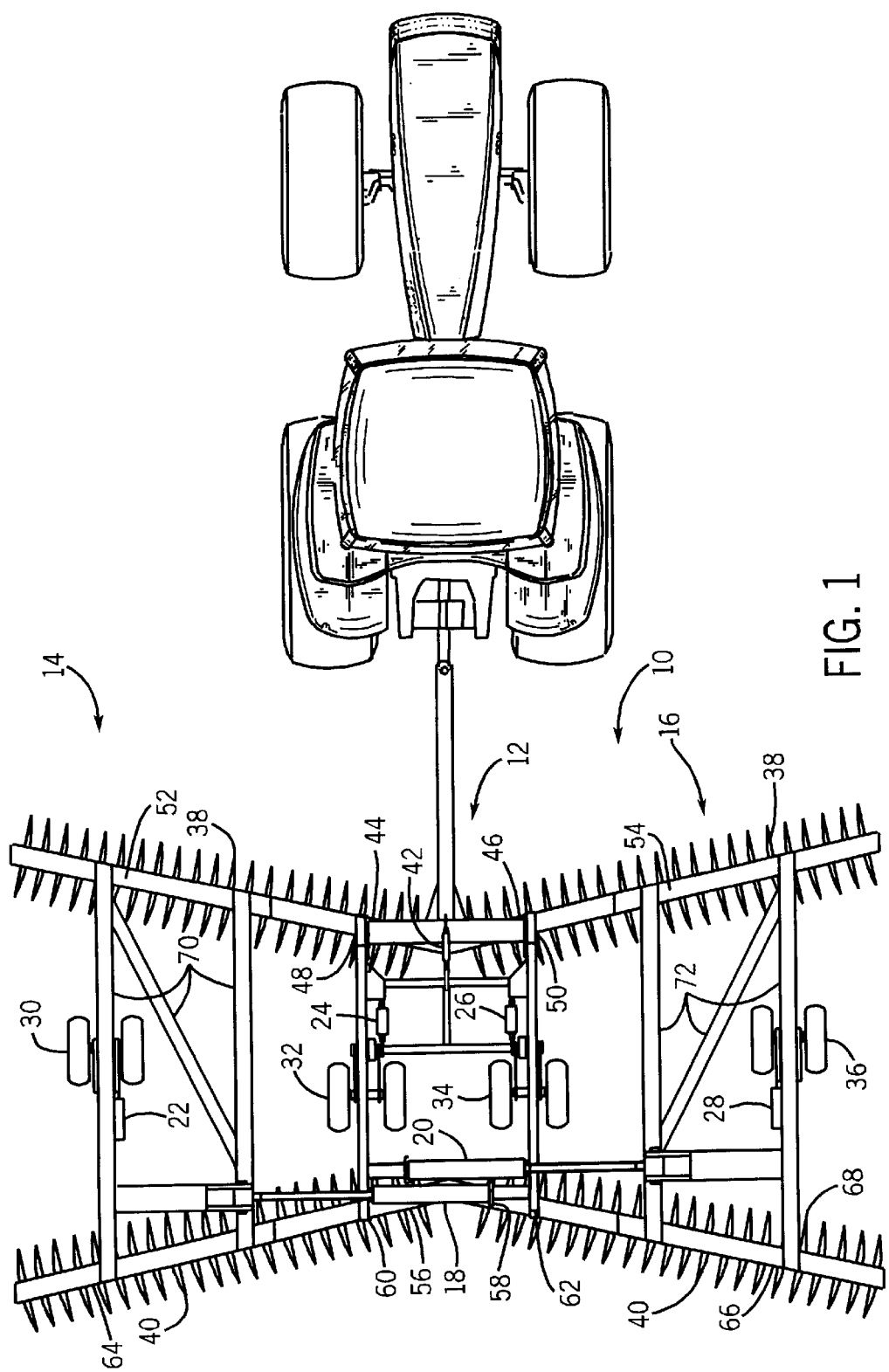
FIG. 1 illustrates an implement in accordance with this invention, having front and rear ranks of ground-engaging tools supported on a central frame and two wings with a leveling system to tilt the implement forward or backward.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

In FIG. 1, an implement 10 is illustrated having a central frame 12, two wings 14 and 16 pivotally coupled to the central frame, lift actuators 18 and 20 for lifting the wings above the frame, wheel actuators 22, 24, 26, and 28 for raising and lowering wheel sets 30, 32, 34, and 36, front tool gang 38 fixed to the front of the frame and wings, rear tool gang 40 fixed to the rear of the frame and wings, and leveling mechanism 42 for leveling the implement.

Front tool gang 38 includes inner forward gang tubes 44 and 46 which are bolted to central frame 12 and extend laterally away from the central frame. These gang tubes have pivotal couplings 48 and 50 disposed at their outer ends to which outer forward gang tubes 52, 54, respectively, are pivotally connected.

Rear tool gang 40 includes inner rear gang tubes 56 and 58 which are bolted to central frame 12 and extend laterally away from the central frame. These gang tubes have pivotal couplings 60 and 62 disposed at their outer ends to which outer rearward gang tubes 64 and 66, respectively, are pivotally connected.

A plurality of ground engaging tools, here shown as disks 68, are fixed to and disposed below each of the gang tubes. Like each pair of inner and outer gang tubes themselves, these disks are arranged in a substantially straight line.

The gang tubes on each side of the implement are bolted to a wing frame on that side of the implement. Outer gang tubes 52 and 64 are coupled to wing frame 70, and outer gang tubes 54 and 66 are coupled to wing frame 72.

Figure 5:
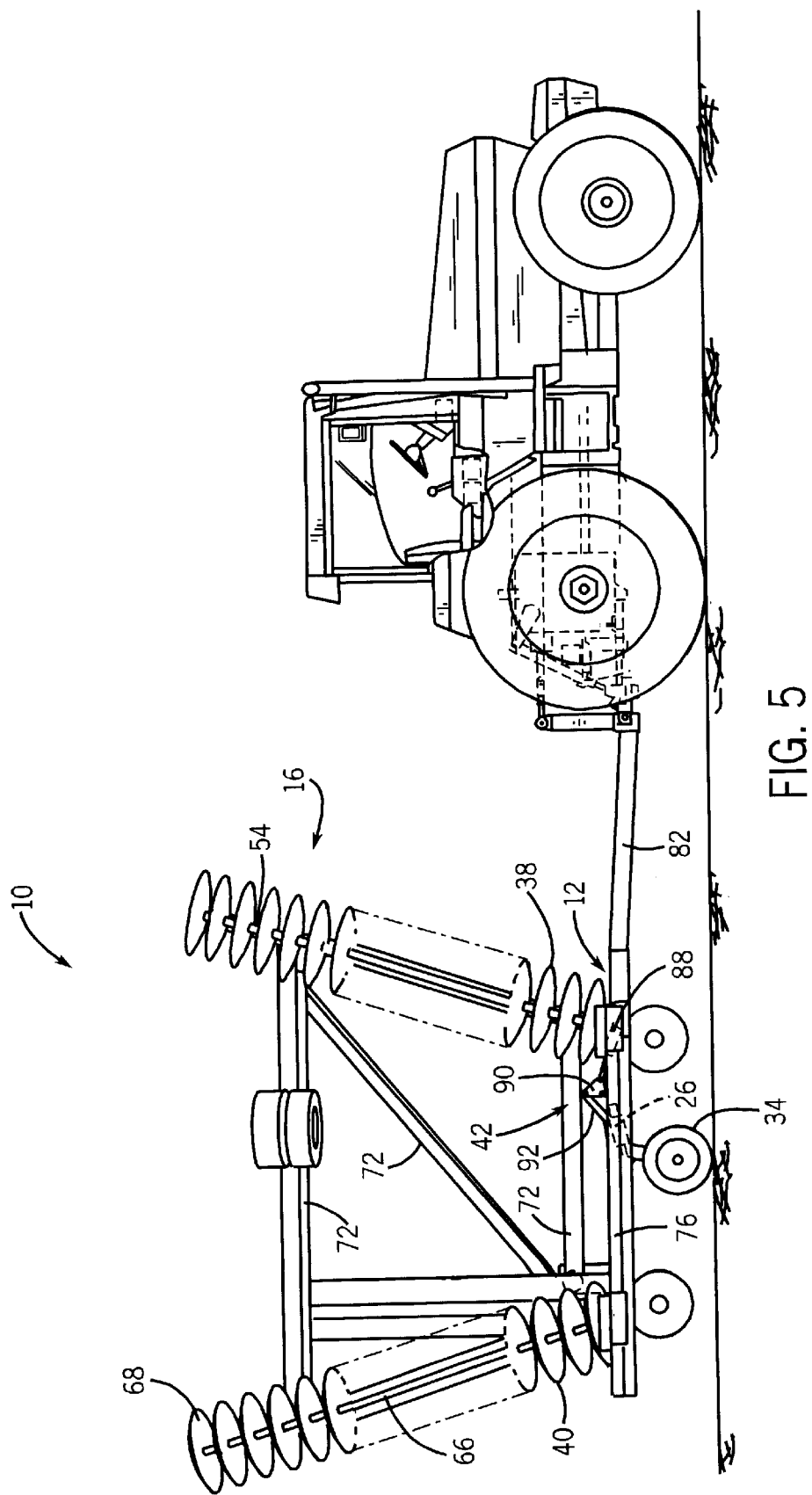
FIG. 5 is a side view of the implement with the wheels lowered and the wings lifted to a road travel position.

The outer gang tubes are pivotally coupled to the inner gang tubes to permit them to be lifted above and over the central frame to permit the implement to be folded up for clearance when towed over the road. This lifting is provided by lift actuators 18 and 20, here shown as hydraulic cylinders. Lift actuator 18 is coupled between central frame 12 and wing frame 70 to lift wing 14, and lift actuator 20 is coupled between central frame 14 and wing frame 72 to lift wing 16. When lift actuators 18 and 20 are retracted, they pull their associated wings 14 and 16 upward and over the top of central frame 12 about pivotal couplings 48, 60, and 50, 62, respectively. This upward position is best shown in FIG. 5.

Wing 14 includes wing frame 70, front and rear gang tubes 52 and 64, respectively, and the ground engaging tools attached to those tubes. Wing 16 includes wing frame 72, front and rear gang tubes 54 and 66, and the ground engaging tools attached to those tubes.

Figure 2:
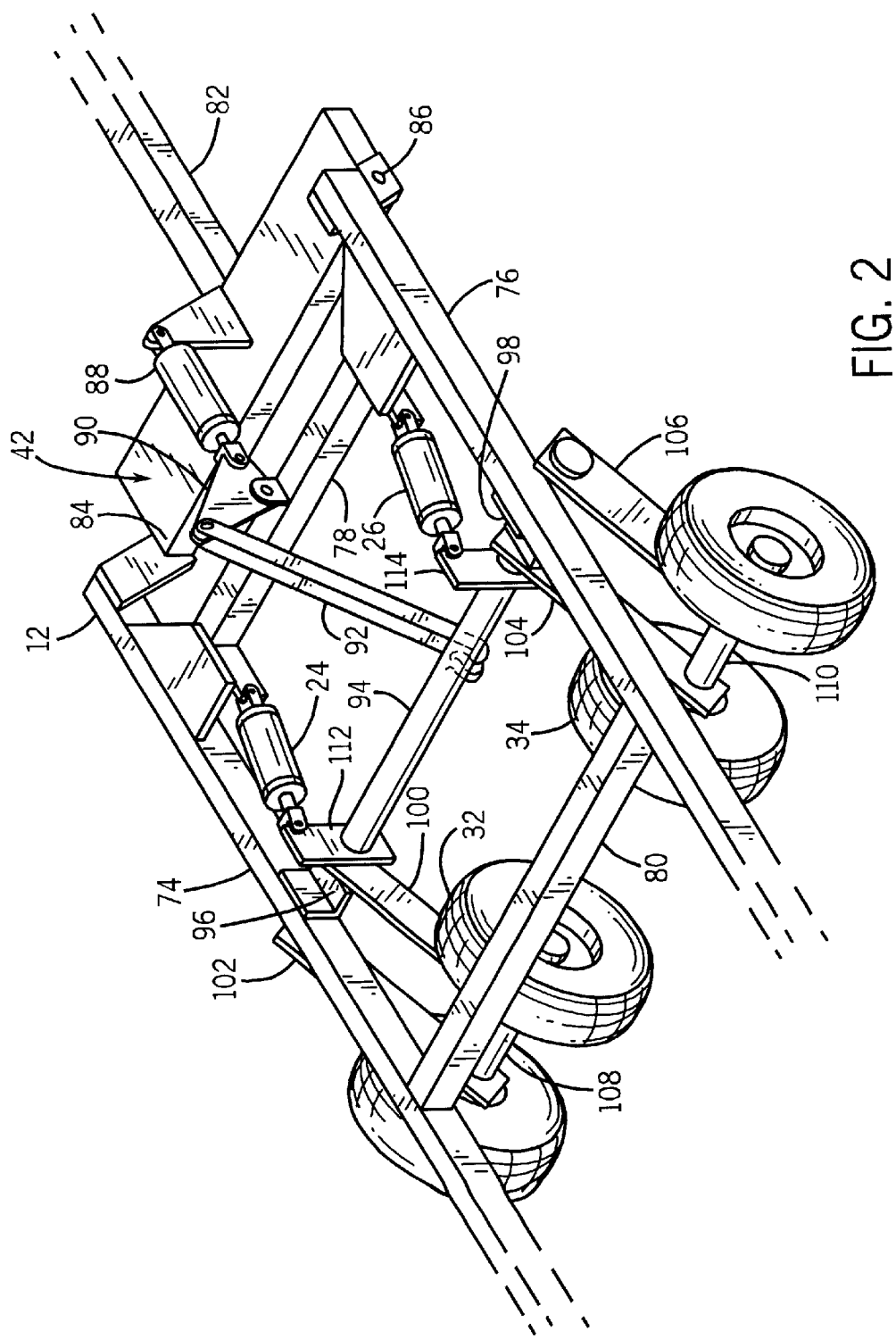
FIG. 2 is a perspective view of the central frame of FIG. 1 showing its associated wheel sets and leveling system in more detail.

Referring to FIG. 2, central frame 12 includes two fore-and-aft extending members 74 and 76 to which wheel sets 32 and 34, respectively, are pivotally mounted. Side-to-side members 78 and 80 are disposed at the front and rear, respectively, of the frame and are coupled to members 74 and 76 to form a substantially rectangular framework. A tongue 82 is pivotally coupled to central frame 12 by two pivotal couplings 84, 86 disposed on each side of central frame 12 and permit the tongue to be raised and lowered with respect to central frame 12. Leveling mechanism 42 includes a leveling actuator 88, here shown as a hydraulic cylinder with one end pivotally coupled to the tongue. The other end of the cylinder is pivotally coupled to a bell crank 90 that is pivotally coupled to cross member 78. Another elongate member 92 is also pivotally coupled to bell crank 90 at one end. The other end of member 92 is pivotally coupled to ROCKER SHAFT 94. ROCKER SHAFT 94 extends laterally across central frame 12 and is supported in rotation at each end by bearings 96 and 98 that are mounted on fore-and-aft members 74 and 76, respectively. Bearings 96, and 98 constrain ROCKER SHAFT 94 to rotate about its longitudinal axis with respect to central frame 12. Four wheel supports 100, 102, 104 and 106 extend downward and rearwardly from ROCKER SHAFT 94 to which they are attached. Wheel supports 100 and 102 are disposed on the inside and the outside, respectively, of bearing 96 and member 74 to which bearing 96 is attached. Wheel supports 104 and 106 are disposed on the inside and outside, respectively, of bearing 98 and fore-and-aft member 76 to which bearing 96 is attached. Thus, when ROCKER SHAFT 94 rotates, it causes the outer ends of wheel supports 100, 102, 104 and 106 to simultaneously and equally raise or lower with respect to central frame 12. Two axles 108 and 110 are provided to which wheel sets 32 and 34 are mounted for rotation. Axle 108 is mounted to the outer ends of wheel supports 100 and 102, and axle 110 is mounted to the outer ends of wheel supports 104 and 106. Wheel set 32 has two wheels that are mounted to opposing ends of axle 108, and wheel set 34 has two wheels that are mounted to opposing ends of axle 110. The wheels in each wheel set are disposed on opposite sides of their associated fore-and-aft member, one inside and one outside. Wheel actuators 24 and 26 are pivotally coupled to fore-and-aft members 74 and 76, at one end, and at the other end to brackets 112 and 114. Brackets 112 and 114 are mounted to ROCKER SHAFT 94 to rotate with ROCKER SHAFT 94 and operate as described below in conjunction with FIGS. 3A and 3B.

Figure 3A:
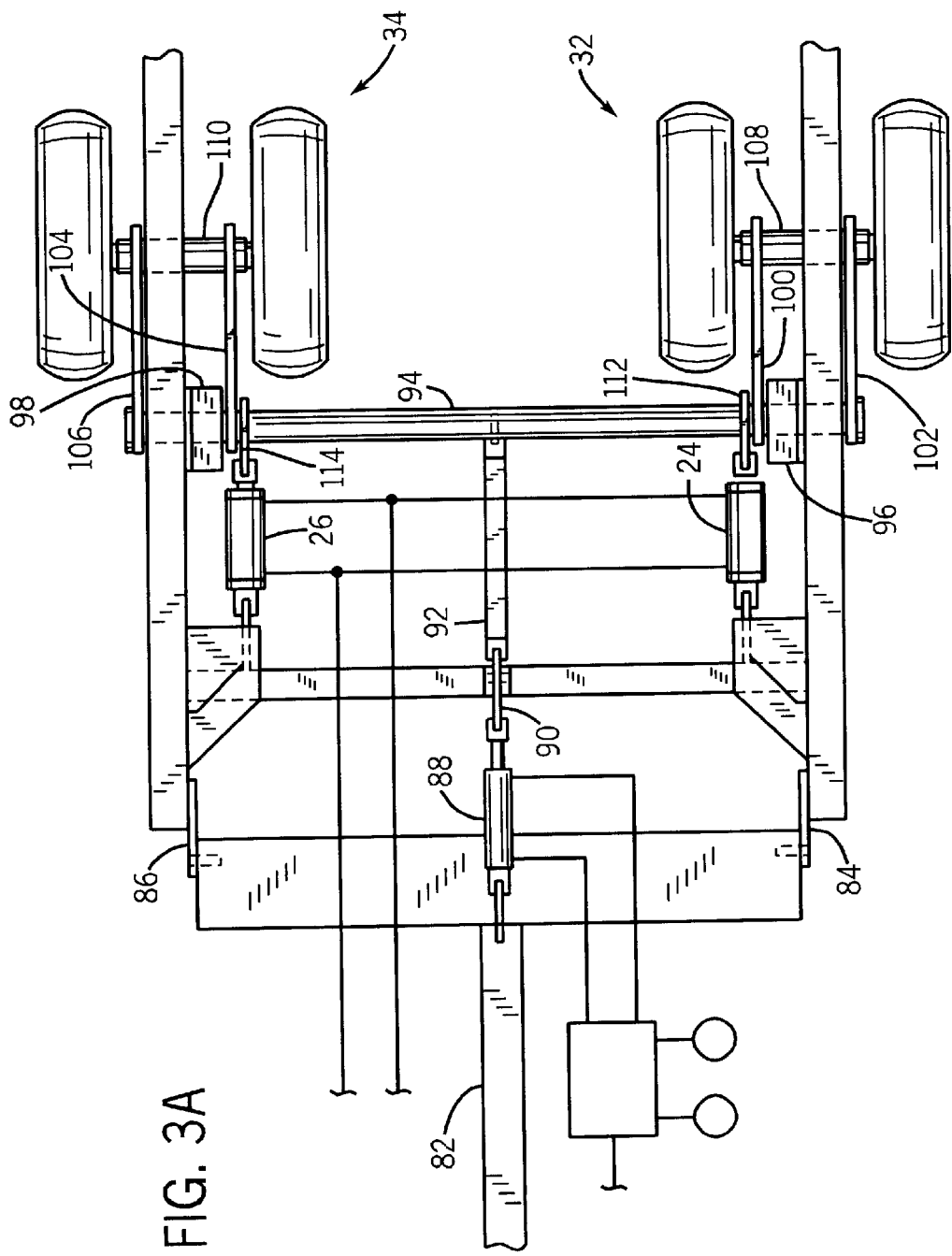
FIGS. 3A and 3B are partial cross sectional top and side views, respectively, of the central frame of FIGS. 1 and 2 showing the mechanical structures that raise and lower the implement, as well as the leveling system.
Figure 3B:
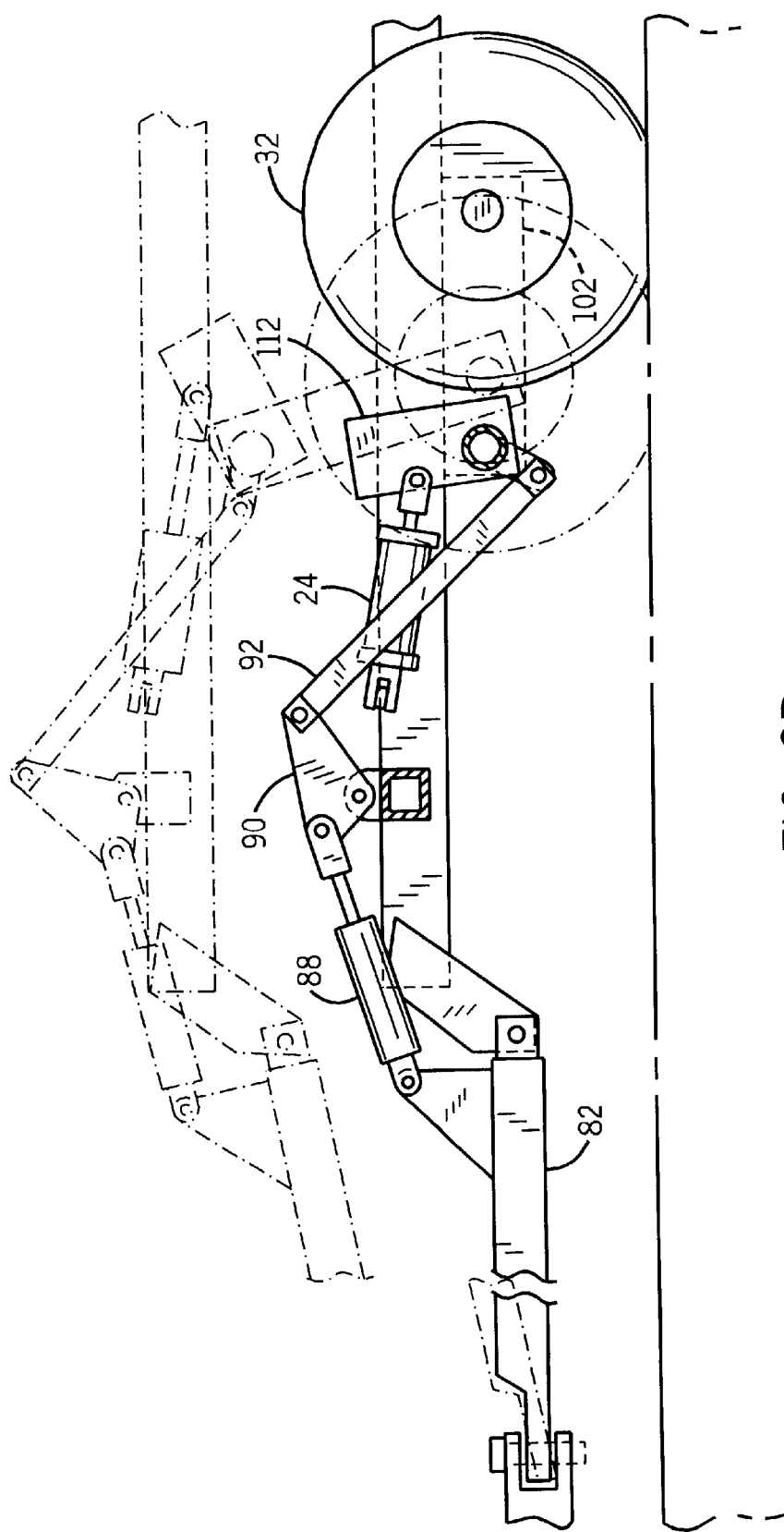

Referring now to FIGS. 3A and 3B, a top and side view of fore-and-aft member 74 together with the associated mechanisms for raising and lowering the wheel sets as well as the leveling system can be seen in more detail. The implement is shown in two positions, a wheel-raised position in which the implement is lowered closer to the ground, and a wheel lowered position in which the implement is raised higher above the ground. The moving components of the implement are shown in dashed lines in the wheel-lowered position and in solid lines in the wheel-raised position to indicate their motion when moved.

When wheel actuators 24 and 26 are retracted, the implement is in the wheel-raised position. When actuators 24 and 26 are extended, they push the upper ends of brackets 112 and 114 away from the actuators toward the rear of the implement. The lower ends of brackets 112 and 114 are coupled to ROCKER SHAFT 94, which causes ROCKER SHAFT 94 to rotated clockwise as shown in FIG. 3B. This clockwise rotation causes wheel supports 100, 102, 104 and 106 to also rotate clockwise. As the wheel supports rotate clockwise, the outer ends of the wheels supports and the two wheels sets coupled to the wheel supports also lower. As a result, the wheels pivot about ROCKER SHAFT 94 as they are lowered.

As ROCKER SHAFT 94 rotates clockwise, it also rotates the lower end of elongate member 92 clockwise, since the lower end is pivotally coupled to ROCKER SHAFT 94. As the lower end of elongate member 92 rotates clockwise, the upper end of elongate member 92, which is coupled to bell crank 90, moves to the left, pivoting counter-clockwise about the pivot point of bell crank 90, and pivoting bell crank 90 counterclockwise as well.

As bell crank 90 pivots counterclockwise, and since one end of leveling actuator 88 is coupled to bell crank 90, leveling actuator 88 moves to the left as well. The other end of leveling actuator 88 is fixed to the tongue and pushes leftward against it, causing the tongue to rotate counter-clockwise about pivotal couplings 84 and 86, thereby lowering the tongue with respect to the central frame.

In this manner, when wheel actuators 24 and 26 extend, they lower both the wheels and the tongue equal amounts as shown in FIG. 3B. When the implement wheels are resting on the ground and the tongue is coupled to a towing vehicle such as a tractor, the wheel actuators cause the central frame to rise substantially evenly. The frame substantially translates with respect to the ground and does not substantially rotate with respect to the ground. The degree to which rotation is tolerable and hence is substantial will depend upon the amount of height control required by a particular ground engaging tool.

Since not every tractor couples to a tongue at the same height, the leveling mechanism is provided to permit the adjustment of the tongue height without affecting the wheel height. This tongue height adjustment is provided by varying the length of leveling actuator 88.

The arrangement described above and shown in FIGS. 3A and 3B will cause the tongue and wheels to move substantially equal amounts up and down with respect to the implement's frame and the front and rear gangs of tools. As shown in those figures, the end of the tongue that engages the tractor is maintained at the same height above ground when the implement is raised and lowered. Since there is no standard implement hitch height on tractors, the implement is provided with a means for adjusting the tongue height with respect to the tractor that will permit the implement to be leveled. This leveling is provided by adjusting the working length (in this case extending or retracting) of leveling actuator 88.

When leveling actuator 88 is extended, the tongue is lowered with respect to the implement while the wheels stay in the same position with respect to the implement as determined by the wheel actuators. If the tongue is coupled to a towing vehicle, and thereby fixed in height, extending leveling actuator 88 causes the front portion of the implement to raise and the rear portion of the implement to lower as the implement pivots about its wheels.

Similarly, when leveling actuator 88 is retracted, it causes the end of the tongue to raise with respect to the implement. If the tongue is connected to a towing vehicle, this causes the front portion of the implement to lower and the rear portion of the implement to raise as the implement pivots about its wheels.

Figure 4:
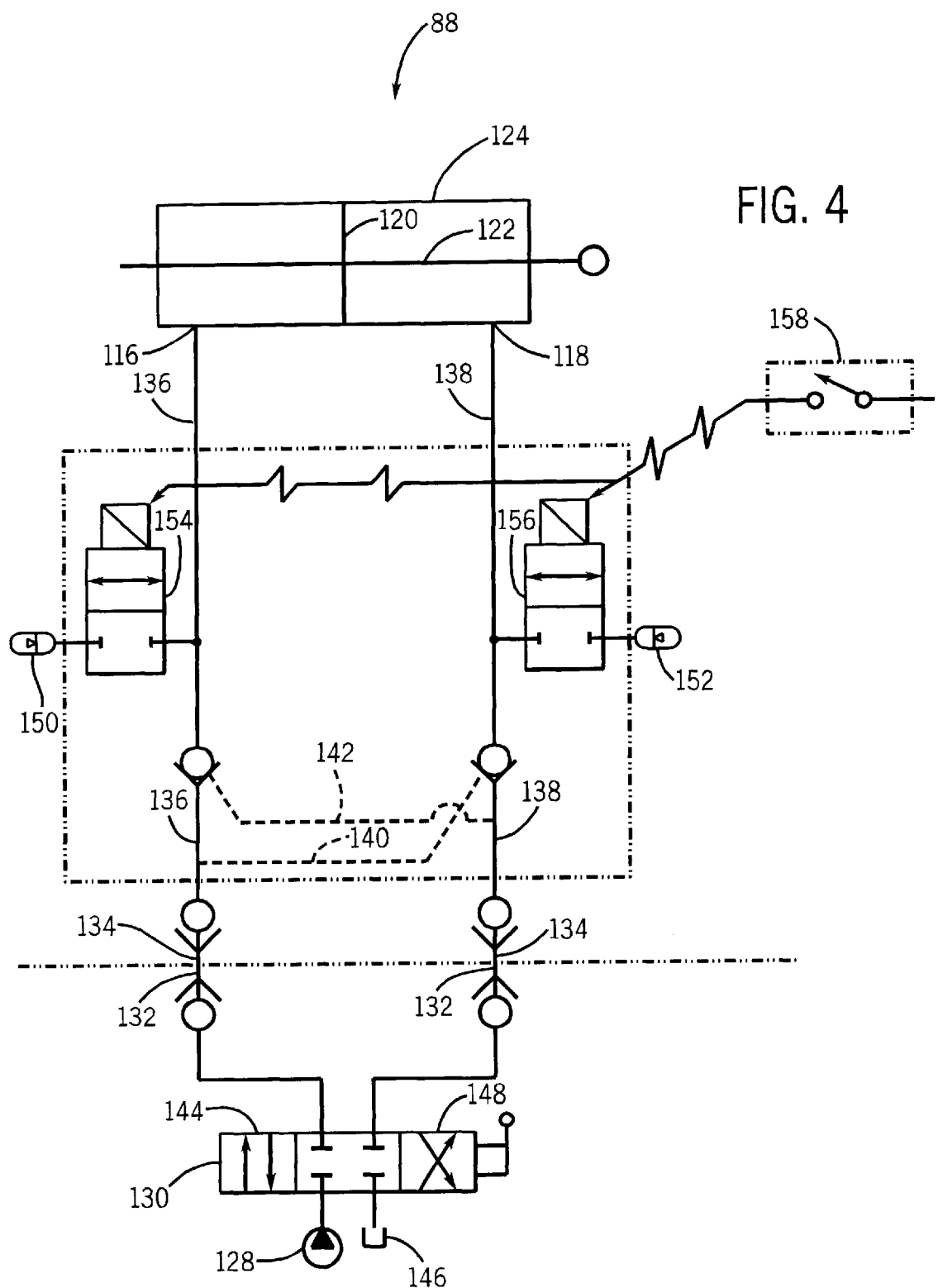
FIG. 4 is a schematic diagram of the control system that controls the lifting and tilting of the implement.

These leveling functions are controlled by the control system shown in FIG. 4. Leveling actuator 88 is shown as hydraulic cylinder 124 in FIG. 4. It is a double-acting cylinder, having a retraction port 118 and an extension port 116. When fluid fills extension port 116, piston 120 moves to the right in FIG. 4. Piston 120 is coupled to piston rod 122 which also moves to the left, and extends from cylinder 124, increasing the length of hydraulic actuator 88 and pivoting the tongue downward with respect to the implement, as described above. Similarly, when retraction port 118 is filled with hydraulic fluid, piston 120 moves to the right in FIG. 4 and piston rod 122 retracts into cylinder 124, pivoting the tongue upward with respect to the implement as described above.

Fluid flow into and out of the leveling actuator is controlled by the hydraulic and electrical circuits fluidly connecting leveling actuator 88 to a hydraulic fluid supply 128. The hydraulic supply is preferably provided by the towing vehicle, although it can be on the implement, instead. In the preferred embodiment, the towing vehicle is a tractor having a hydraulic supply 128 and an auxiliary hydraulic valve 130 for controlling the direction and flow rate of hydraulic fluid from the supply. A two port hydraulic connector or coupler 132 is provided at a manifold on the rear of the tractor to which a mating hydraulic connector or coupler 134 can be attached. Coupler 134 is coupled to hydraulic lines 136 and 138 that extend from the tractor to the implement. The coupler are preferably of the quick-connecting type to permit the implement to be easily attached and removed from the tractor.

Two pilot operated check valves 140, 142 are cross-coupled and disposed in each of lines 136 and 138 to limit the escape of hydraulic fluid from the hydraulic circuit when it is disconnected from the tractor at the couplers. Lines 136 and 138 are fluidly coupled to extension port 116 and retraction port 118 to conduct fluid to each of these ports from auxiliary hydraulic valve 130.

To lower the tongue, thus tilting the front of the implement up and the rear of the implement down, the operator moves auxiliary hydraulic valve 130 to position 144 in which fluid flows from hydraulic fluid supply 128 through check valve 140, through hydraulic line 136 and into extension port 116. Fluid flowing into extension port 116 causes piston 120 to move to the right, extending the piston rod and evacuating the retraction side of the piston. As fluid is evacuated from the retraction side of the piston it travels back toward the tractor through hydraulic line 138, through check valve 142, and back through auxiliary hydraulic valve 130 to tank 146. To raise the tongue, the valve is moved to position 148 and the direction of flow through the various components is reversed from that described immediately above.

When the implement is drawn though the field, a certain degree of flexibility is required to permit the ground-engaging tools on the implement to accurately follow the contours of the ground. As the implement is towed over a convex portion of the field, such as over the top of a hillock, it is beneficial to permit the front portion of the implement to pivot upward with respect to the tractor. In this manner, all the tools on the front gang and the rear gang can penetrate the soil substantially the same amount. The same problem exists when the implement is drawn across a concave portion of the filed, such as across a small valley. In the case of the concave portion of the field, it would be desirable to raise the tongue with respect to the implement to permit the front portion of the implement to pivot downward with respect to the tractor.

This upward and downward pivoting capability could be provided directly by the operator by having the operator control the auxiliary hydraulic valve to raise or lower the tongue. Such an arrangement, however, would require the operator's constant attention. Furthermore, the operator is not able to accurately determine the ground contours accurately without constantly looking backward to examine the implement.

Rather than adding an additional duty to the already overburdened operator, the control system of FIG. 4 permits the automatic adjustment of the implement in response to ground contours by providing two hydraulic accumulators to the control system, as shown in FIG. 4.

Hydraulic lines 136 and 138 are in fluid communication with two hydraulic accumulators 150 and 152, respectively, that permit some flexure of the tongue in response to the implement being drawn over ground with different profiles.

Accumulators 150 and 152 are preferably of the gas-filled variety and operate in the following manner. When the implement is drawn over a convex portion of the field, the field will apply a force to the front gang of ground-engaging tools, and the force applied to the rear gang of ground-engaging tools will decrease as the ground falls away from it. As a result of this force imbalance, the front of the implement will be lifted, increasing the pressure in the retraction side of the leveling actuator and decreasing the pressure in the extension side of the leveling actuator.

With no accumulators, there would simply be a pressure change; and the tongue of the implement would not move with respect to the implement. The front gang would dig more deeply and the rear gang would dig more shallowly or perhaps be lifted entirely out of the ground.

With accumulators in fluid communication with hydraulic lines 136 and 138, the tongue will flex (pivot) downward with respect to the implement. Since the implement is supported by the wheels and the tongue, the implement pivots about its wheels to accommodate the change in ground contours.

As the pressure increases in the retraction side of the leveling actuator, some of the fluid in the retraction side will be forced out and will flow into accumulator 152, pressurizing its gas. Similarly, the reduction in pressure in the extension side of the leveling actuator will cause the fluid in accumulator 150 to flow into the extension side of leveling actuator. These flows into and out of the accumulators will continue until the pressure in the accumulators and the leveling actuator are equalized.

As the fluid flow into and out of the leveling actuator in response to ground contour changes, the tongue rises or falls with respect to the implement, accommodating the ground contours and permitting the implement to flexibly and automatically respond. In this manner, the implement automatically responds to the changing contours of the ground.

Accumulators 150 and 152 can be selectively connected or disconnected from the leveling actuator by hydraulic valves 154 and 156, respectively, that are coupled between the accumulators and the leveling actuator. These valves are controlled by field transport switch 158 that is coupled to hydraulic valves 154 and 156.

The accumulators are preferably disconnected from the leveling actuator when the implement is being towed on the street. FIG. 5 shows the implement in street towable condition, with both wings raised. The mass moment of inertia of the implement about the implement wheels is substantially raised by lifting the wings. The longer the wings extend away from the center of the implement, the higher the center of mass of the implement. In addition, when the wings are lifted, the implement is supported by a single row of wheels, and not by two gangs of tools and wheels. The tongue prevents the implement from rocking backwards and forward about the substantially straight rotational axis provided by wheels sets 32 and 34. As a result, when the system is disturbed, such as by the implement going over a bump or into a pot hole, the implement frame has a strong tendency to rock forward and rearward about wheel sets 32 and 34, resisted substantially solely by the tongue, and specifically by leveling actuator 88 that controls the tongue height with respect to the implement. This oscillation is enhanced by the hydraulic accumulators 150 and 152, which permit the tongue to flex up and down with respect to the implement frame.

To reduce this oscillation, tongue flexure is limited by fluidly uncoupling the accumulators from the leveling actuator. This significantly reduces flexure of the tongue and thereby reduces implement fore-and-aft oscillation in the wing-lifted road position.

In the embodiment of FIG. 4, the hydraulic accumulators are coupled and uncoupled from the leveling actuator by actuating field/transport switch 158. This switch is coupled to and controls the opening and closing of two accumulator valves 154 and 156 disposed between the accumulators and the leveling actuator. The switch may be mounted in a location for manual operation by the operator of the vehicle, or it may be mounted for automatic operation. For example, the switch may be mounted in or about the operator's cab of the towing vehicle to permit the operator to manually operate it when he changes over from field travel with wings down to road travel with wings up. Alternatively, and to reduce the burden on the operator, the switch may be automatically operated when the wings are folded or unfolded. For example, the switch may be located so that it is automatically operated when the wings are folded and unfolded. A preferred arrangement would be to have the switch disposed between the wings and the central portion of the implement so that the various components that move with respect to each other when the wings are lifted would operate the switch to uncouple and couple the accumulators. The switch may be actuated by the relative motion of the wings and frame when the wings are lifted and lowered. Similarly, the switch could be connected to a single accumulator rather than both accumulators. Such an arrangement would raised the maximum pressure applied to the cylinder during road travel, but would permit a reduction in the number of parts required on the implement.

Switch 158 is shown in the embodiment of FIG. 4 as an electrical switch and accumulator valves 154 and 156 are actuated by an electric solenoid. Alternatively, switch 1 58 can be a pneumatic or hydraulic switch, and valves 154 and 156 can be actuated by a pneumatic or hydraulic signal provided by switch 158.

Thus, it should be apparent that there has been provided in accordance with the present invention a self-leveling towed implement that fully satisfied the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system for leveling an implement having a tongue engageable to a towing vehicle for towing the implement, comprising:

a hydraulic cylinder having a first hydraulic fluid port disposed to move the cylinder when filled with fluid in a first direction wherein the cylinder is mechanically culpable to the tongue to raise and lower the tongue with respect to the implement when the cylinder is actuated;

a first gas-filled hydraulic accumulator fluidly coupled to the first hydraulic fluid port on the cylinder;

a first on/off valve coupled between the first accumulator and the first hydraulic fluid port on the cylinder to connect and disconnect the first accumulator from fluid communication with the cylinder;

a first directional control valve to selectively connect the first hydraulic port to a source of hydraulic fluid under pressure to fill the cylinder with hydraulic fluid and to a hydraulic tank to drain the cylinder of hydraulic fluid; and an operator-actuable switch for actuating the first on/off valve.

2. The system of claim 1, further comprising a first check valve disposed between the first hydraulic fluid port and the first directional control valve and disposed to limit the return of fluid from the first hydraulic fluid port to the first directional control valve.

3. The system of claim 2, wherein the cylinder has a second hydraulic fluid port disposed to move the cylinder when filled with fluid in a second direction opposite the first direction, the system further comprising:

a second gas-filled hydraulic accumulator fluidly coupled to the second hydraulic fluid port on the cylinder;

a second on/off valve coupled between the second accumulator and the second hydraulic fluid port on the cylinder to connect and disconnect the second accumulator from fluid communication with the cylinder; and a second directional control valve to selectively connect the second hydraulic port both to the source of hydraulic fluid under pressure to fill the cylinder with hydraulic fluid and to the hydraulic tank to drain the cylinder of hydraulic fluid.

4. The system of claim 3, wherein the first and second directional control valves are coupled to drain fluid from the cylinder through the first hydraulic fluid port to the tank while simultaneously filling the cylinder with hydraulic fluid through the second hydraulic fluid port from the hydraulic supply.

5. The system of claim 4, wherein the operator-actuable switch also actuates the second on/off valve.

6. The system of claim 5, further comprising a second check valve disposed between the second hydraulic fluid port and the second directional control valve and disposed to limit the return of fluid from the second hydraulic fluid port to the second directional control valve.

7. The system of claim 6, wherein the first and second check valves are pilot operated, and wherein a pilot line for each of the first and second check valves is cross coupled to the other of the first and second check valves.

8. An agricultural implement, comprising:
   a implement frame;
   a tongue pivotally coupled to the implement frame to be raised and lowered with respect to the frame and configured to be coupled to a towing vehicle to tow the implement;
   a hydraulic cylinder having a first hydraulic fluid port disposed to move the cylinder when filled with fluid in a first direction wherein the cylinder is mechanically coupled to the tongue to raise ad lower the tongue with respect to the implement frame when the cylinder is actuated;
   a first gas-filled hydraulic accumulator fluidly coupled to the first hydraulic fluid port on the cylinder;
   a first on/off valve coupled between the first accumulator and the first hydraulic fluid port on the cylinder to connect and disconnect the first accumulator from fluid connection with the cylinder.
   a first directional control valve to selectively connect the first hydraulic port both to a source of hydraulic fluid under pressure to fill the cylinder with hydraulic fluid and to a hydraulic tank to drain the cylinder of hydraulic fluid; and
   an operator-acutable switch for actuating the first on/off valve.

9. The implement of claim 8, further comprising a first check valve disposed between the first hydraulic fluid port and the first directional control valve and disposed to limit the return of fluid from the first hydraulic fluid port to the first directional control valve.

10. The implement of claim 9, wherein the cylinder has a second hydraulic fluid port disposed to move the cylinder when filled with fluid in a second direction opposite the first direction, the implement further comprising:
    a second gas-filled hydraulic accumulator fluidly coupled to the second hydraulic fluid port on the cylinder;
    a second on/off valve coupled between the second accumulator and the second hydraulic fluid port on the cylinder to connect and disconnect the second accumulator from fluid communication with the cylinder; and
    a second directional control valve to selectively connect the second hydraulic port both to the source of hydraulic fluid under pressure to fill the cylinder with hydraulic fluid and to the hydraulic tank to drain the cylinder of hydraulic fluid.

11. The implement of claim 10, wherein the first and second directional control valves are coupled to drain fluid from the cylinder through the first hydraulic fluid port to the tank while simultaneously filling the cylinder with hydraulic fluid through the second hydraulic fluid port from the hydraulic supply.

12. The implement of claim 11, wherein the operator-actuable switch also actuates the second on/off valve.

13. The implement of claim 12, further comprising a second check valve disposed between the second hydraulic fluid port and the second directional control valve and disposed to limit the return of fluid from the second hydraulic fluid port to the second directional control valve.

14. The implement of claim 13, wherein the first and second check valves are pilot operated, and wherein a pilot line for each of the first and second check valves is cross coupled to the other of the first and second check valves.

15. A method of reducing fore-and-aft oscillations in a towed implement, the towed implement having a tongue pivotally coupled to an implement frame, a hydraulic cylinder coupled between the tongue and the implement frame, a hydraulic cylinder coupled between the tongue and the implement frame to raise or lower the tongue with respect to the frame thereby causing the implement frame to tilt forward and backward about at least two implement wheels coupled to and supporting the implement frame, at least one wing pivotally coupled to the implement frame and configured to be raised with respect to the implement frame to a position above the frame, and a gas-filled hydraulic accumulator fluidly coupled to cylinder, the method comprising the steps of:
    pivoting the wing upward with respect to the implement frame;
    engaging automatically a position switch indicative of an upwardly pivoted wing position;
    disengaging the accumulator from the cylinder; and
    responding automatically to the position switch engagement.

16. The method of claim 15, wherein the position switch is electrically coupled to an on/off valve disposed to engage and disengage the accumulator from the cylinder.

17. The method of claim 15, wherein the step of disengaging the accumulator from the cylinder includes the step of manually actuating a switch electrically coupled to an on/off valve disposed to engage and disengage the accumulator from the cylinder.

* * * * *